J. C. COTTRELL.
CONVERTIBLE STOCK AND GRAIN CAR.
APPLICATION FILED SEPT. 7, 1910.
1,097,304.
Patented May 19, 1914.
9 SHEETS—SHEET 1.
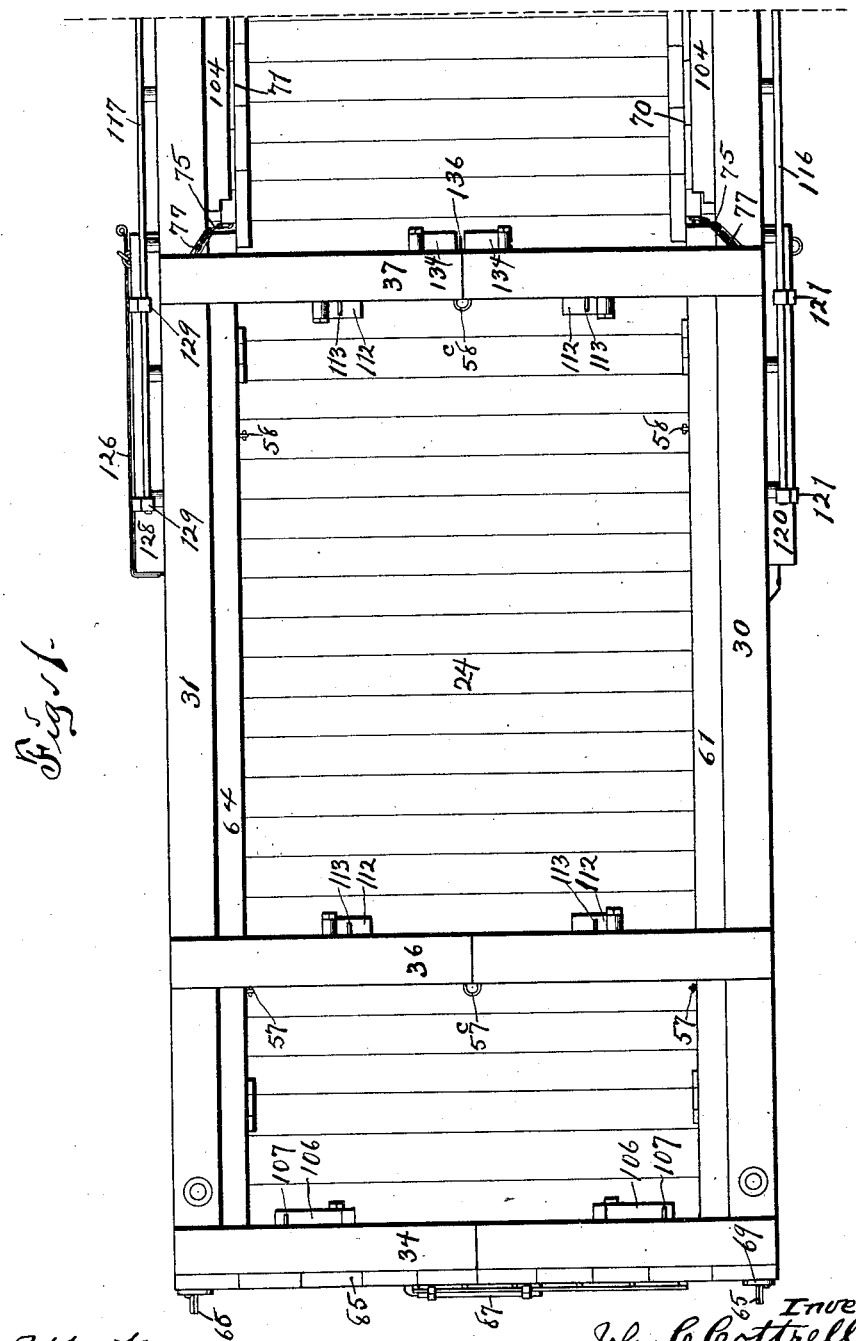

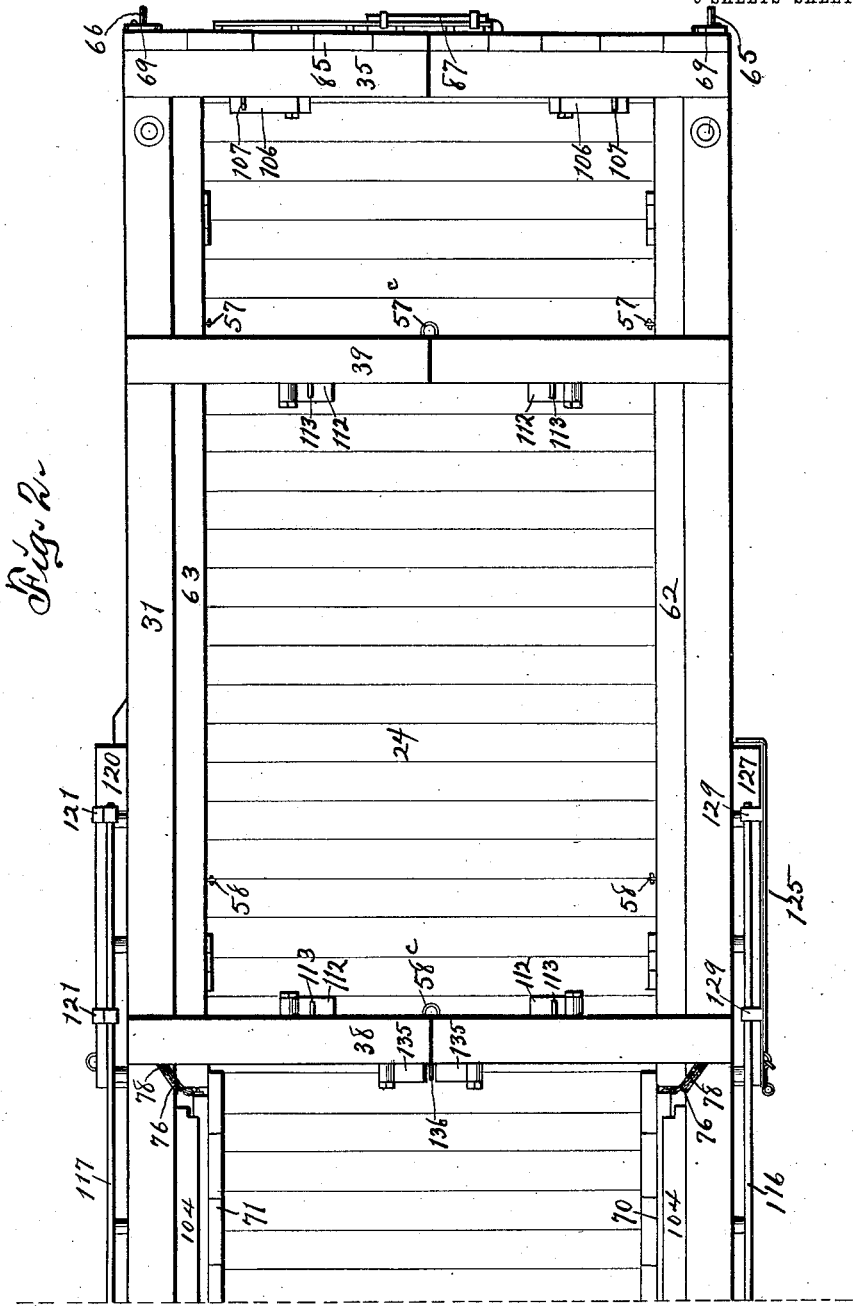

J. C. COTTRELL.
CONVERTIBLE STOCK AND GRAIN CAR.
APPLICATION FILED SEPT. 7, 1910.
1,097,304.
Patented May 19, 1914.
9 SHEETS—SHEET 3.
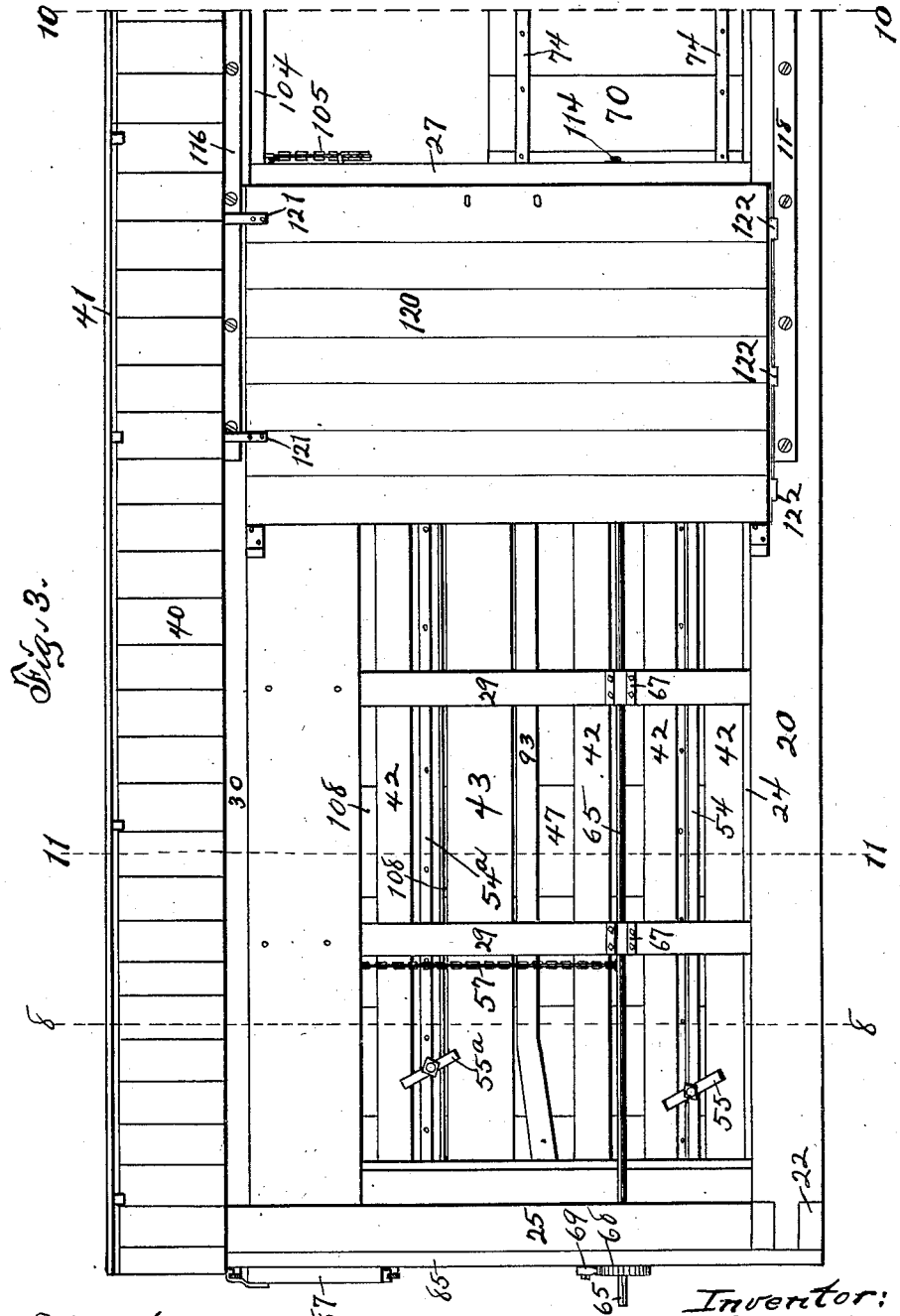

J. C. COTTRELL.
CONVERTIBLE STOCK AND GRAIN CAR.
APPLICATION FILED SEPT. 7, 1910.
1,097,304.
Patented May 19, 1914.
9 SHEETS—SHEET 4.
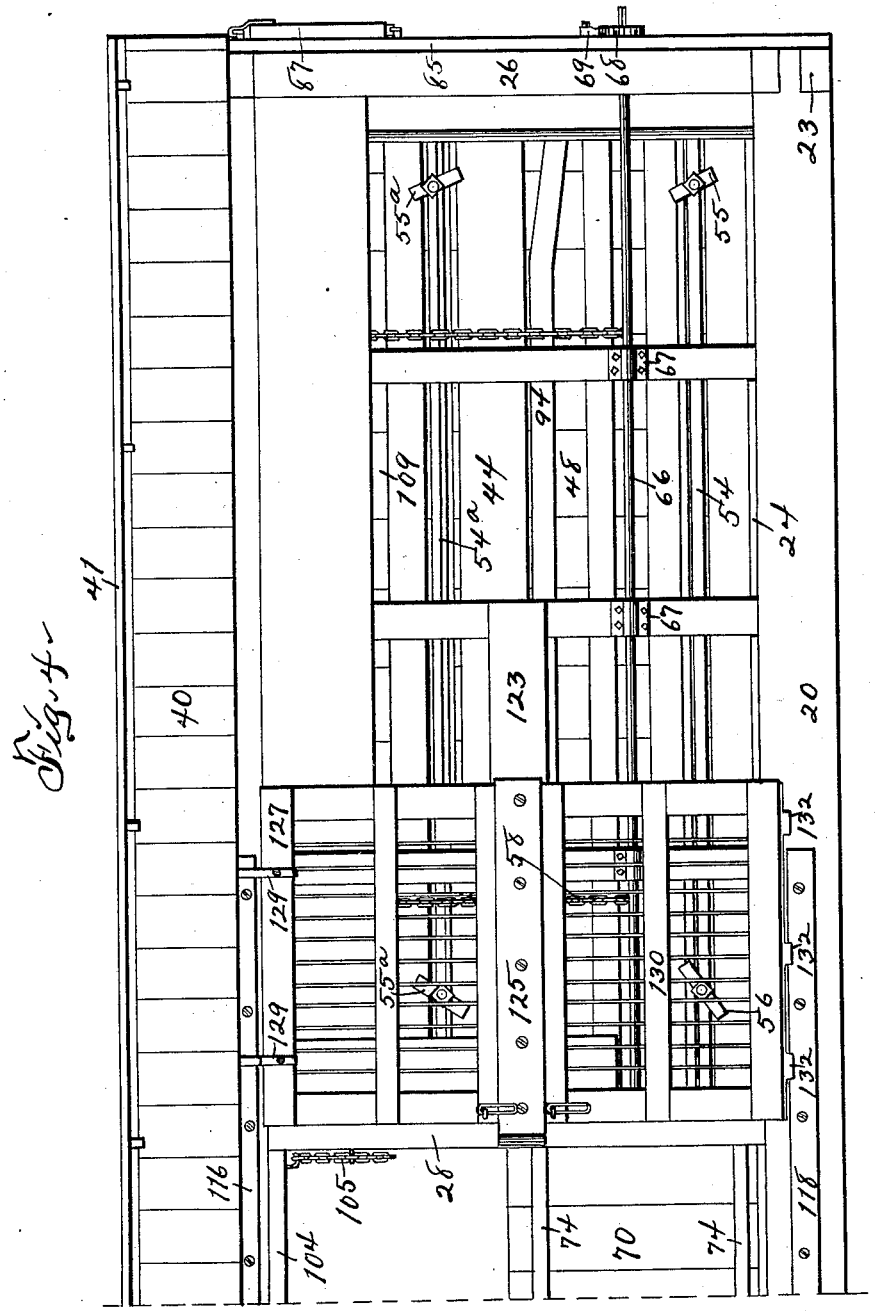

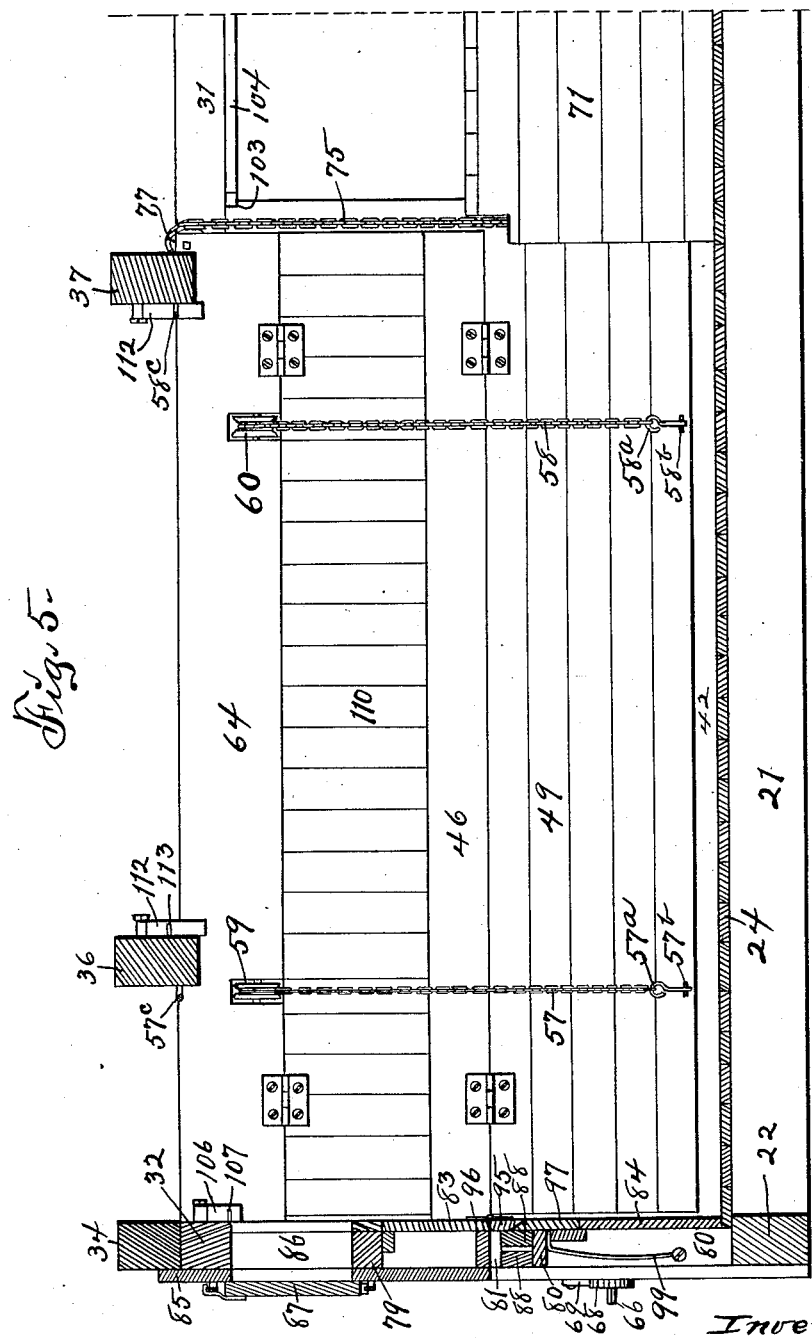

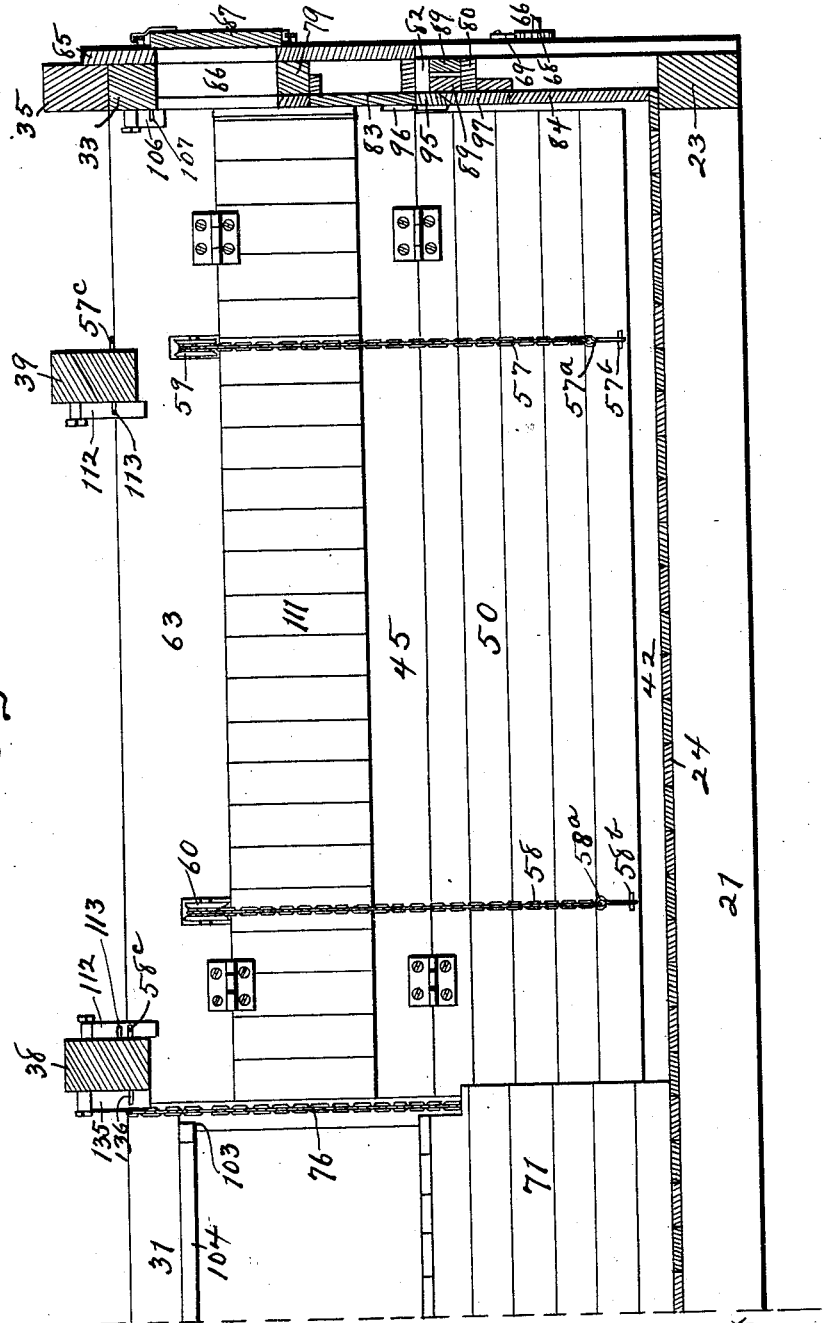

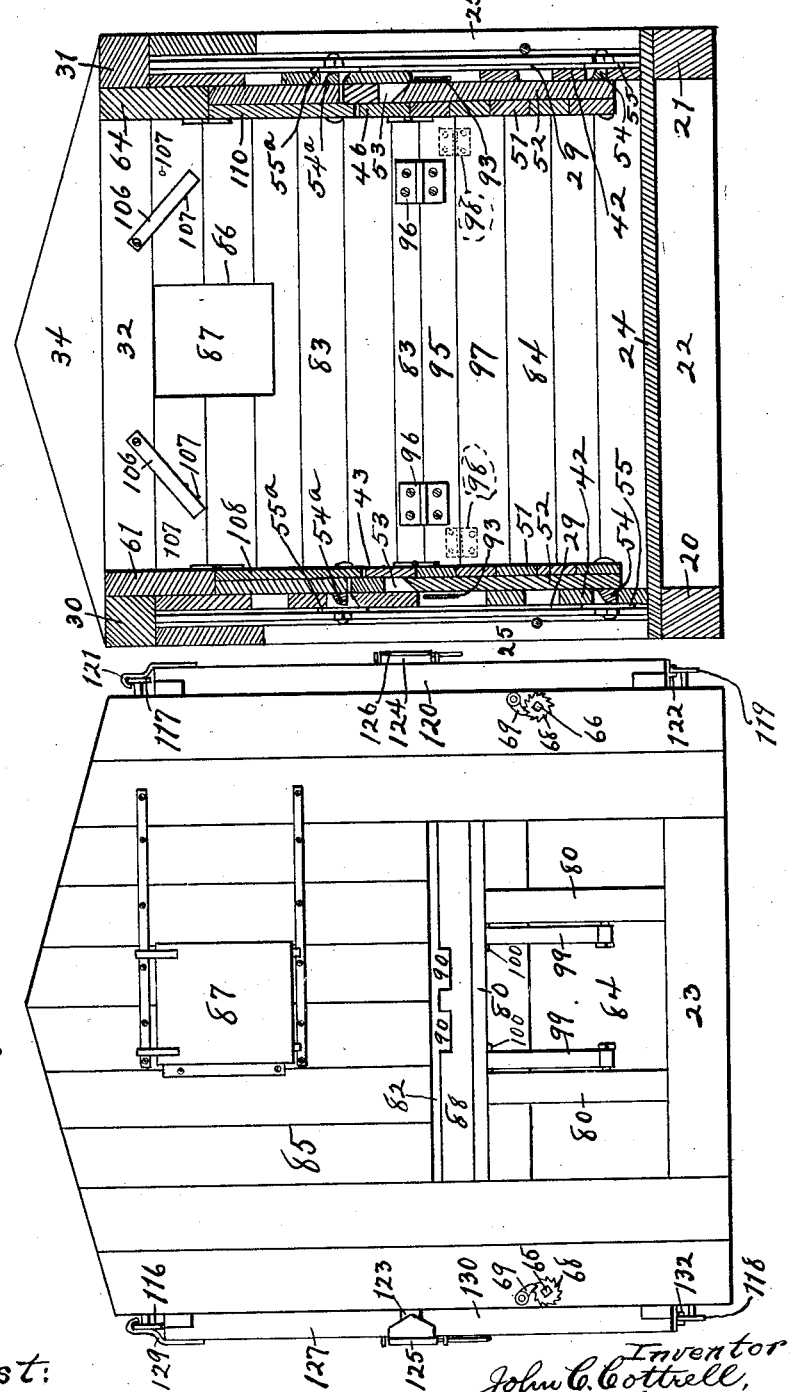

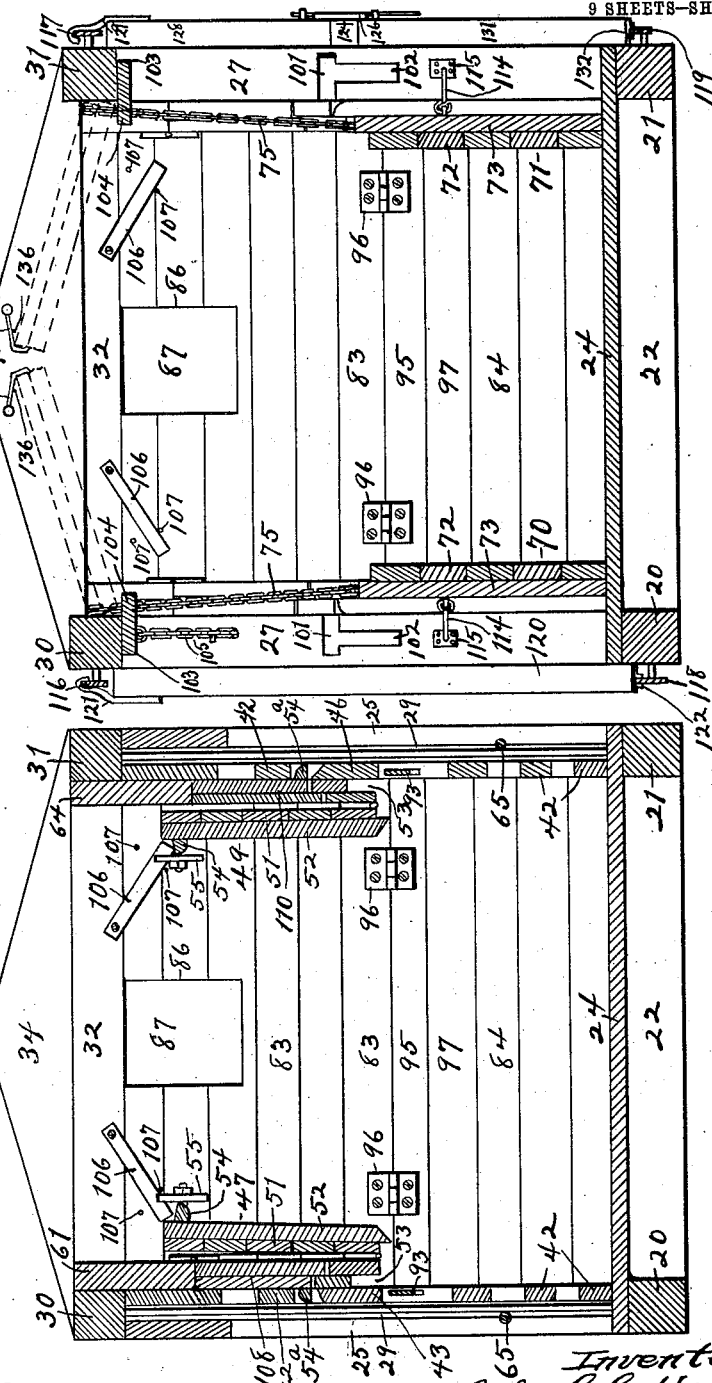

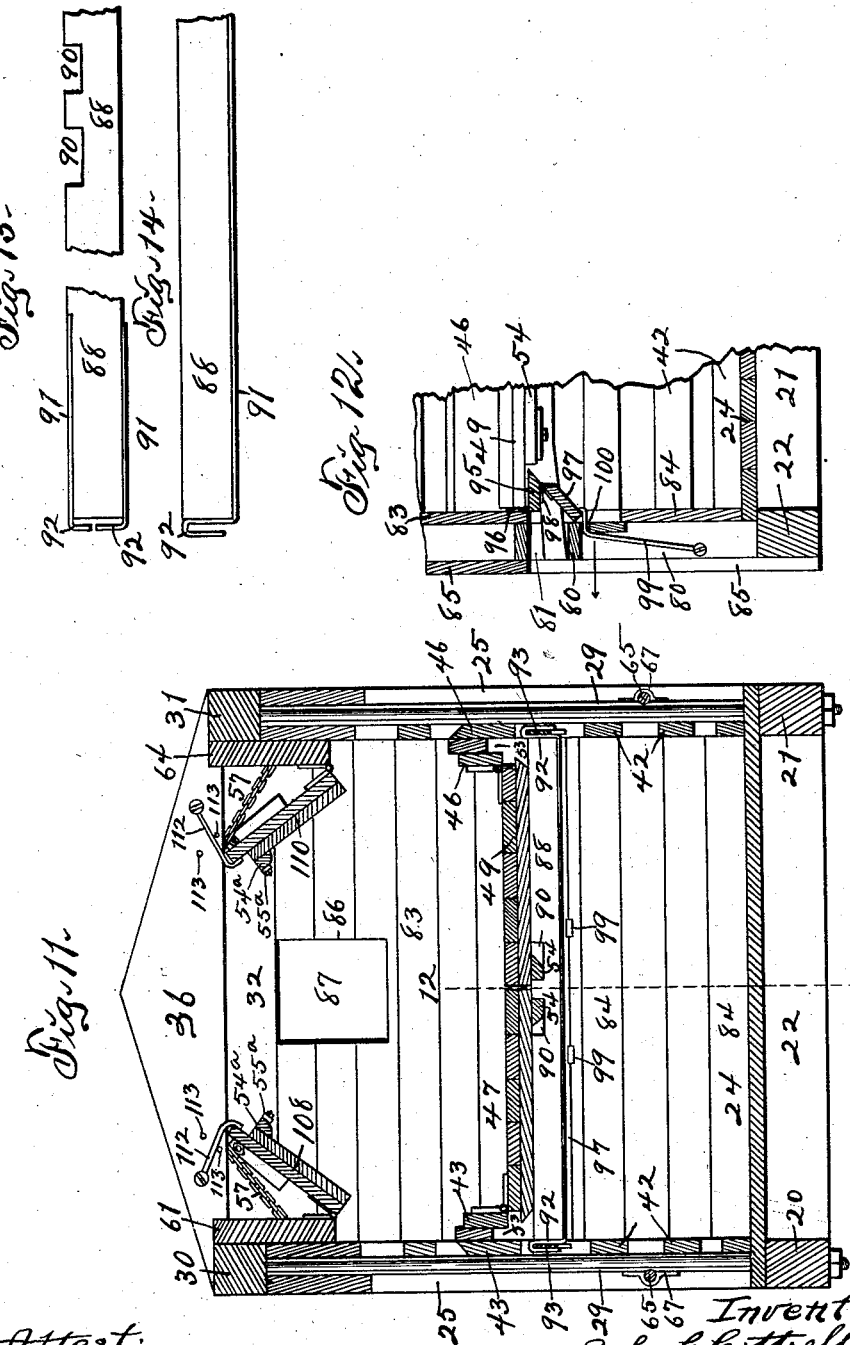

UNITED STATES PATENT OFFICE.

JOHN C. COTTRELL, OF KINGSLEY, IOWA.

CONVERTIBLE STOCK AND GRAIN CAR.

1,097,304.  Specification of Letters Patent.  Patented May 19, 1914.

Application filed September 7, 1910. Serial No. 581,286.

*To all whom it may concern:*

Be it known that I, JOHN C. COTTRELL, a citizen of the United States of America, and resident of Kingsley, Plymouth county, Iowa, have invented a new and useful Convertible Stock and Grain Car, of which the following is a specification.

The object of this invention is to provide an improved construction for convertible stock and grain cars.

A further object of this invention is to provide improved means for supporting an upper deck in a double-deck stock car.

A further object of this invention is to provide improved means for adjusting supporting devices of the upper deck of a double-deck stock car.

A further object of this invention is to provide improved means for adjusting and supporting members of an upper deck in inoperative positions.

A further object of this invention is to provide improved means for adjusting and supporting lining members of a car in inoperative positions.

A further object of this invention is to provide improved means for adjusting and supporting grain-car doors in inoperative positions.

A further object of this invention is to provide improved means for utilizing portions of end linings of a grain car in supporting end portions of upper deck members when said grain car is converted into a double-deck stock car.

A further object of this invention is to provide improved windlass and cable devices for manipulating lining sections of a grain car when said car is converted into a stock car of either full height or double-deck variety.

A further object of this invention is to provide means for utilizing grain-doors of cars in forming central portions of the upper deck of a double-deck stock car.

A further object of this invention is to provide interchangeable doors of imperforate and skeleton form respectively, the skeleton doors being formed in pairs and adapted for independent use in respect of upper and lower decks of a double-deck stock car.

My invention consists in the construction, arrangement and combination of elements hereinafter set forth, pointed out in my claims and illustrated by the accompanying drawing, in which—

Figure 1 is a plan of one-half portion of my improved car adjusted for use as a grain car, the roof boards being removed. Fig. 2 is a plan of the remaining half portion of the car, the roof boards being removed. Figs. 1 and 2 should be read together as presenting a complete plan except as to the roof boards. Fig. 3 is a side elevation of one-half portion of my improved car, adjusted for use as a grain car, the outer doors being open and the grain-doors in place. Fig. 4 is a similar view of the other half portion of the car. Figs. 3 and 4 should be read together as illustrating a complete side elevation of the car. Fig. 5 is a vertical section longitudinally of and comprising one-half portion of my improved car, adjusted as a grain car, the roof boards being removed. Fig. 6 is a similar vertical section of the other half portion of the car. Figs. 5 and 6 should be read together as illustrating a complete longitudinal section of the grain car, except as to the roof boards. Fig. 7 is an end elevation of the car adjusted for use as a grain car. Fig. 8 is a cross-section on the indicated line 8—8 of Fig. 3, the adjustment as a grain car being continued. Fig. 9 is a cross-section on the indicated line 8—8 of Fig. 3, the lower linings being adjusted into elevated positions as required to convert the grain car into a stock car having a single level. Fig. 10 is a cross-section on the indicated line 10—10 of Fig. 3, the dotted lines indicating elevated positions of the grain-doors. Fig. 11 is a cross-section on the indicated line 11—11 of Fig. 3, the lower side linings being adjusted to form an upper deck for stock purposes and the upper side linings being adjusted into inoperative and elevated positions in order that the portion of the car above the upper deck may be ventilated. Fig. 12 is a vertical section on the indicated line 12—12 of Fig. 11 showing the use of portions of the end linings of the grain car as supports for end portions of the upper deck. Figs. 13 and 14 are detail views of a supporting bar employed in multiple and adapted to carry at times the upper deck of the car supplementary to the end supports provided by portions of the end linings.

The general structure of the car as shown follows closely that of stock cars now in general use and previously patented to myself and others and involves a base frame composed of side sills 20, 21 and cross sills 22, 23 suitably connected and braced; a floor 24 on the sills; corner posts 25, 26 rising from the ends of the side sills; jamb posts 27, 28 rising from central portions of the side sills and suitably spaced apart to form door-ways; studding 29 between the corner posts and jamb posts and also rising from the side sills; side plates 30, 31 and end plates 32, 33 carried by the corner posts, jamb posts and studding and suitably connected thereby to and parallel with the sills; rafters 34, 35 arranged in pairs and carried by the end plates 32, 33; rafters 36, 37, 38 and 39 also arranged in pairs and carried by the side plates 30, 31; roof boards 40 suitably supported from the rafters; a running board 41 suitably supported at the ridge of the roof; end frames between the corner posts; side slats or bars 42 mounted in horizontal positions on the inner faces of the corner posts and jamb posts and studding and suitably spaced apart; doors, and means for hanging and supporting the same. In order to adapt the car for use as a double-deck stock car it is desirable that the interior height thereof shall be somewhat greater than that of the ordinary stock car. Girders 43, 44, 45, 46 are mounted horizontally on and fixed to the inner faces of the corner posts and jamb posts and studding approximately at the centers thereof and side bars or slats 42 are omitted at the points of location of said girders. Lower linings 47, 48, 49, 50 are hinged at their upper margins to and at times depend from the lower margins of the girders 43, 44, 45, 46, the inner faces of said linings and girders being flush with each other. The lower linings preferably are constructed of double thickness by employing one set of boards 51 (Fig. 8) arranged horizontally and another set of boards 52 arranged to cross the boards 51 at right angles and fixed thereto. The upper ends of the boards 52 preferably extend beyond the upper margin of the uppermost board 51, are beveled and extend within grooves 53 in the lower margins of the girders 43, 44, 45, 46. The lower linings also preferably are formed with cleats or battens 54 extending across and fixed to the outer faces of the lower ends of the boards 52 and adapted, when the linings are in vertical depending positions, to enter between slats or side bars 42 near the bottoms of the sides of the car. Turn buttons 55, 56 are pivoted on end portions of the battens or cleats 54 and are adapted, when turned into horizontal positions, to pass with said battens through spaces between side bars or slats and also adapted to be turned manually crosswise and in engagement with outer faces of said slats as shown in Figs. 3 and 4. One of the turn buttons 56 is concealed in Fig. 3 by a door. It is the function of the turn buttons 55, 56 to hold the lower linings rigidly in contact with the side bars or slats 42 and form imperforate wall sections of the car. Draft devices such as chains 57, 58 (one of which is hidden by the door in Fig. 3) are run over sheaves 59, 60 mounted in frieze-boards 61, 62, 63, 64 fixed to the inner faces of and depending from the side plates 30, 31. The outer end portions of the chains 57, 58 are fixed to and adapted to be wound on drum shafts 65, 66, which drum shafts are arranged horizontally and journaled in bearings 67 on the studding 29 and also are journaled at their ends in the corner posts and jamb posts and project outward from said corner posts. The outer end portions of the drum shafts 65, 66 are formed angular in cross-section as adapted to receive cranks or winches (not shown) for manual rotation and said outer end portions of the shafts also carry ratchet wheels 68 adapted to be engaged at times and held by gravity pawls 69 suitably supported on end boards of the car. The inner end portions of the chains 57, 58 are detachably connected by hooks $57^a$, $58^a$ to eyes $57^b$, $58^b$ on the inner faces of the lower margins of the lower linings and are adapted to be released therefrom and engaged by the hooks to eyes $57^c$, $58^c$ on the rafters 36, 37, 38, 39 at times. Grain-doors 70, 71 are provided and preferably are of approximately the same height as the lower linings 47, 48, 49, 50. Each grain-door preferably is constructed of inner boards 72 arranged horizontally and of a length to extend across the side doorways and overlap adjacent end portions of the lower linings, and vertical boards 73 adapted to cross at right angles and be fixed to the horizontal boards and project slightly above the upper margin thereof. The vertical boards 73 also preferably are connected at their upper and lower end portions by bands or battens 74 extending across their outer faces. Chains 75, 76 are fixed at one end to notched corner portions of the grain-doors 70, 71, are rove through sheaves 77, 78 mounted in the side plates 30, 31 at the upper corners of the doorways and are secured at their opposite ends to counterbalancing weights of common form (not shown) adapted to run in pockets alongside the inner faces of the jamb posts.

The end frames of the car constructed of upper and lower members designated generally by the numerals 79, 80 (Figs. 5, 6 and 7), which upper and lower members are separated by horizontal spaces 81, 82. The inner faces of the upper members 79 of the end walls are lined with boards 83 and the inner surfaces of the lower members of the end walls are lined with boards 84. The outer surfaces of the end walls are partially lined by boards 85 (Fig. 7) and doorways 86 are formed in the upper portions of the outer and inner linings and are closable by sliding doors 87 mounted in a common manner and arranged for movement parallel with the outer linings. The spaces 81, 82 serve as pockets or reserve seats for supporting bars 88, 89 provided in pairs, one pair for each pocket. The supporting bars 88, 89 are alike in construction (Figs. 13 and 14) and preferably are made of wood with notches 90 adjacent to and on opposite sides of the center of their upper margins and metal straps 91 on their upper and lower margins, or either of them, which metal straps terminate in hooks 92 at their outer ends. The hooks 92 are adapted to engage over or embrace and slide on metal tracks 93, 94 fixed to the corner posts 25, 26, jamb posts 27, 28 and studding 29 and spaced inward therefrom. The metal tracks 93, 94 are alike on opposite sides of the car (Fig. 8) and are located approximately parallel with, slightly spaced from and below the girders 43, 44, 45, 46. Main body portions of the tracks 93, 94 are located with their upper margins almost as high as the upper margins of the spaces or pockets 81, 82 and outer end portions of said track are inclined downwardly in order that the supporting bars may be moved along said tracks into and out of said pockets and pass beneath leaves (hereinafter described) in entering or leaving said pockets. It is the function of the supporting bars 88, 89 to support inner end and central portions of the lower linings 47, 48, 49, 50 when said linings are adjusted into horizontal positions transversely of the interior of the car as illustrated in Fig. 11 and the notches 90 in said supporting bars are provided to accommodate the battens 54 on said linings. Provision needs to be made for closing the spaces or pockets 81, 82 at times to prevent leakage of grain from the car and also for supporting the outer ends of the lower linings 47, 48, 49, 50, and I have arranged to do both of these things by one means, as follows: Leaves 95 are hinged at their upper margins to the lower margins of the lining boards 83 and are adapted to depend at times from said support partially across the spaces or pockets 81, 82. Hinges 96 connecting the leaves 95 to the boards 83 are arranged on the inner surfaces thereof in order that said linings may be moved inwardly and upwardly through arcs. Leaves 97 are hinged at their upper margins to the lower margins of the leaves 95 and are adapted to depend at times from the latter leaves across and complete the filling of the spaces or pockets 81. Hinges 98 (dotted lines Fig. 8) are employed to connect the leaves 97 to the leaves 95 and are countersunk in outer faces of said leaves in order that the leaves 97 may be moved through arcs relative to the leaves 95 into the positions shown in Fig. 12. The leaves 95, 97 may be conjunctively moved through arcs inwardly and upwardly relative to the end walls of the car to permit the supporting bars 88, 89 to be moved into or out of the pockets 81; or said leaves may be allowed to depend within and across said pockets as shown in Figs. 5, 6 and 8 and serve to close said pockets against the leakage of grain; or said leaves may be adjusted into the positions shown in Figs. 11 and 12 wherein each upper leaf projects inward at right angles to the lining boards 83 and receives and supports the outer end of a pair of lower linings 47—50 or 48—49 and such upper leaf is sustained by a lower lining arranged in bracing relation thereto. When in such positions last above described the lower leaves 97 are supported by hooks 98, 99, which hooks are arranged in pairs at either end of the car, are pivoted at their lower ends on studding of the lower frame members 80 and extend at their upper hooked ends through notches 100 (Fig. 12) immediately below the pockets 81. The hooks 98, 99 are adapted for manual adjustment through the notches 100 so that the hooked end portions thereof may extend across the plane of and support the lower margins of the leaves 97. The hooks 98, 99 may be moved manually outwardly in the direction of the arrow in Fig. 12 out of the plane of the leaves 97 to permit said leaves and the leaves 95 to descend into closing relations with the pockets 81. When the lower linings 47, 48, 49, 50 are supported by the bars 88, 89 and leaves 95, 97 in horizontal positions projected across the interior of the car as shown in Fig. 11, the grain-doors 70, 71 are placed in horizontal positions extending from doorway to doorway across the car and bridging the space between ends of said lower linings, end portions of the boards 72 overlapping and resting on end portions of the linings while the boards 73 engage between the linings and prevent endwise movement of the grain-doors.

Transverse notches 101 are formed in opposing faces of the jamb posts 27, 28 near the centers thereof and vertical notches 102 are formed in said faces of the jamb posts below and in communication with the first notches. Transverse notches 103 are formed in opposing faces of the jamb posts 27, 28 immediately below the side plates 30, 31. The notches 101 and 103 open toward the interior of the car and bars 104 are adapted to be manually placed in or removed from said notches as desired. When the car is used for transporting grain the bars 104 are reserved or placed in inoperative stored positions in the notches 103 (Fig. 10). When the car is used for emigrant purposes or for transportation of large stock such as cattle and horses the bars 104 may be placed manually in the vertical notches 102 and effect a partial closure of the side doorways of the car. When the car is used for the transportation of small live-stock such as sheep, goats and swine and for such purpose is double decked as illustrated in Fig. 11, the bars 104 are placed manually in the notches 101 and serve to bridge the space compassed by the width of the jamb posts 27, 28 and also lap over on projecting end portions of the boards 73 of the grain cars, thus providing bridges of stable character on which the small live-stock can walk from the loading chutes (not shown) to the floor section formed by the grain-doors. In the latter position the bars 104 also provide supports for outer end portions of bridges usually provided to extend from the loading chutes to the car floors. The bars 104 are connected by chains 105, one for each pair, to jamb posts 27 or 28, which chains are of such length as to permit any desired movement of the bars and at the same time prevent removal and loss thereof. When the car is employed for the transportation of large live-stock or of small live-stock in single-deck form, the lower linings 47, 48, 49, 50 may be turned upward across the upper linings and upper portions of the side walls of the car into the positions indicated in Fig. 9. In the positions just described the lower linings 47, 48, 49, 50 are supported by detents 106 pivoted to the end plates 32, 33 and engaging edges of the linings. The detents 106 are limited in oscillatory movement by stops 107 projecting inward from the uppermost interior lining boards 83. The detents 106 are adapted for manual operation to release the linings 47, 48, 49, 50 but will yield upwardly and drop into place automatically when said linings are raised to the positions shown in Fig. 9 by manipulation of the drum shafts 65, 66 and chains 57. Upper linings 108, 109, 110, 111 are hinged at their upper margins to the frieze-boards 61, 62, 63, 64 and are adapted to depend at times across the spaces between said frieze-boards and the upper margins of the girders 43, 44, 45, 46 and prevent leakage of grain through said spaces. The upper linings are constructed identically as are the lower linings and the cleats or battens 54ª thereof are adapted to extend between a slot or bar 42 and the girders and be secured thereto by manual adjustment of turn buttons 55ª carried by said battens and adapted to engage the outer faces of the slats and girders in like manner as the buttons 55 engage outer faces of the lower slats. The upper linings 108, 109, 110, 111 are adapted to be raised and lowered manually and when raised into the positions shown in Fig. 11 said linings are supported by hooked detents 112, which detents are pivoted on rafters 36, 37, 38, 39 and are adapted for manual oscillation or adjustment into and out of engagement with said linings. The detents 112 are limited as to oscillatory movement by stops 113 on opposite sides thereof and projecting horizontally from the rafters carrying said detents. Hooks 114 are pivoted to side portions of the grain-doors 70, 71 and are adapted to engage at times in socket plates 115 fixed to opposing faces of the jamb posts 27, 28. It is the function of the hooks 114 and socket plates 115 to lock the grain-doors in place against the jamb posts so as to prevent leakage of grain around said doors. The hooks 114 depend from the lower surfaces of the grain-doors when said doors form parts of the upper deck of the car in bridging the space between the linings 47, 48, 49, 50. Metal tracks 116, 117 are mounted on the outer faces of the side plates 30, 31 and extend approximately equal distances on opposite sides of the side doorways of the car. Metal guide-bars 118, 119 are fixed to the outer faces of the side sills 20, 21 of the car parallel with the metal tracks 116, 117. Imperforate doors 120 are mounted by means of suitable hangers 121 on the tracks 116, 117 and are adapted to be moved slidingly longitudinally thereof by manual actuation. Yokes 122 are fixed to the lower end portions of the doors 120 and said yokes are adapted loosely to embrace the upper margins of the guide-bars 118 and confine the lower end portions of the doors to the wall of the car.

The imperforate doors 120 may be employed at any time and under any conditions to close the side doorways of the car and said doors may be provided with any suitable locking or sealing means. Ribs 123, 124 are mounted horizontally on and fixed to the outer faces of jamb posts and studding opposite girders. The ribs 123, 124 are located on the opposite sides of the doorways from the doors 120, when said doors are in open position, and serve as stops to determine the closed positions of said doors. Face plates 125, 126 are mounted on and project above and below the outer faces of the ribs 123, 124. Skeleton doors 127, 128 are supported by suitable hangers 129 to and are adapted to slide on the metal tracks 116, 117. The lower marginal portions of the skeleton doors 127, 128 are confined between the upper portions of the face plates 125, 126 and the adjacent walls of the car. The skeleton doors 127, 128 are adapted to be employed to close the upper one-half portions of the side doorways of the car when said car is used for the transportation of stock or when for any reason it is desired to ventilate the car. Skeleton doors 130, 131 are mounted between the ribs 123, 124 and the metal guide-bars 118, 119 and are connected to the latter by yokes 132, 133 on their lower end portions. The upper end portions of the skeleton doors 130, 131 are confined by the lower portions of the face plates 125, 126. The skeleton doors 130, 131 are adapted to be moved manually longitudinally of the guide-bars 118, 119 and are shaped and arranged to close the lower one-half portions of the side doorways of the car when said car is employed for the transportation of stock or when the doors are used for ventilation. It will be observed that one end portion of each plate 125, 126 projects over a side doorway and serves to prevent the skeleton doors from swinging away from the side walls of the car when in closed position. Any desired and suitable means of latching or sealing the skeleton doors may be employed. It will be observed that the skeleton doors are of such construction that either of them may be closed independently of any other, thus providing for loading or unloading either deck of the car and at the same time confining stock to the other deck. The grain-doors 70, 71 may be raised into the positions shown by dotted lines in Fig. 10. In such elevated positions the grain-doors are sustained at their outer margins by the counterbalances previously described and at their inner margins by detents 134, 135 pivoted on the rafters 37, 38. The detents 134, 135 are adapted for manual release from the doors 70, 71 but they will rise and fall into place automatically when said doors are raised into dotted position. The detents 134, 135 are limited as to oscillation by stops 136 in and projecting horizontally from the rafters 37, 38 above and below said detents.

I claim as my invention—

1. In a convertible stock and grain car, a deck adapted to be supported intermediate of the roof and floor of the car, leaves pivotally secured to the end walls of the car, other leaves pivotally secured to the first mentioned leaves, said first mentioned leaves being adapted to be extended horizontally and support the ends of said deck, the last mentioned leaves being adapted to support the first mentioned leaves in their horizontal positions, and hooks pivotally secured to said end walls of the car and adapted to be adjusted through said walls into supporting relation with said last mentioned leaves.

2. In a convertible stock and grain car having end walls formed with pockets, tracks on the side walls of said car, each track communicating at one end with one end portion of a pocket, supporting bars adapted to be located in said pockets at times and shaped and arranged for engagement with and travel on said tracks, lower linings hinged to the side walls of the car and adapted to be moved through arcs into horizontal positions at right angles to said side walls, said lower linings adapted to rest on said supporting bars.

3. In a convertible stock and grain car having end walls formed with pockets, tracks on the side walls of said car, each track communicating at one end with one end portion of a pocket, supporting bars adapted to be located in said pockets at times and shaped and arranged for engagement with and travel on said tracks, lower linings hinged to the side walls of the car and adapted to be moved through arcs into horizontal positions at right angles to said side walls, said lower linings adapted to rest on said supporting bars, and means for bridging the spaces between adjacent end portions of said lower linings.

4. In a convertible stock and grain car having end walls formed with pockets, tracks on the side walls of said car, each track communicating at one end with one end portion of a pocket, supporting bars adapted to be located in said pockets at times and shaped and arranged for engagement with and travel on said tracks, lower linings hinged to the side walls of the car and adapted to be moved through arcs into horizontal positions at right angles to said side walls, said lower linings adapted to rest on said supporting bars, and leaves hinged to the end walls of the car and adapted to close said pockets at times.

5. In a convertible stock and grain car having end walls formed with pockets, tracks on the side walls of said car, each track communicating at one end with one end portion of a pocket, supporting bars adapted to be located in said pockets at times and shaped and arranged for engagement with and travel on said tracks, lower linings hinged to the side walls of the car and adapted to be moved through arcs into horizontal positions at right angles to said side walls, said lower linings adapted to rest on said supporting bars, and leaves hinged to the end walls of the car and adapted to close said pockets at times, said leaves also adapted to be extended beneath end portions of said lower linings and serve as supports therefor.

6. In a convertible stock and grain car having end walls formed with pockets, tracks on the side walls of said car, each track communicating at one end with one end portion of a pocket, supporting bars adapted to be located in said pockets at times and shaped and arranged for engagement with and travel on said tracks, lower linings hinged to the side walls of the car and adapted to be moved through arcs into horizontal positions at right angles to said side walls, said lower linings adapted to rest on said supporting bars, and leaves hinged to the end walls of the car and adapted to close said pockets at times, said leaves formed in pairs hinged together, one leaf of each pair adapted to be projected beneath end portions of a pair of said linings, the other leaf of each pair adapted to be adjusted into bracing relation with the first leaf.

7. In a convertible stock and grain car having end walls formed with pockets, tracks on the side walls of said car, each track communicating at one end with one end portion of a pocket, supporting bars adapted to be located in said pockets at times and shaped and arranged for engagement with and travel on said tracks, lower linings hinged to the side walls of the car and adapted to be moved through arcs into horizontal positions at right angles to said side walls, said lower linings adapted to rest on said supporting bars, leaves hinged to the end walls of the car and adapted to close said pockets at times, said leaves formed in pairs hinged together, one leaf of each pair adapted to be projected beneath end portions of a pair of said linings, the other leaf of each pair adapted to be adjusted into bracing relation with the first leaf, and hooks pivoted on the end walls of the car and adapted to be adjusted through said walls into supporting relation with the latter leaves.

8. In a convertible stock and grain car, in combination with the permanent side walls of the car formed with slats spaced apart, linings for the lower portion of the walls pivotally secured to the walls intermediate of the roof and floor of the car, linings for the upper portion of the walls pivotally secured to the walls adjacent to the roof of the car, the first mentioned linings being adapted to swing to a horizontal position and form a portion of a deck intermediate of the floor and roof of the car, or to be swung through an arc of substantially one hundred and eighty degrees and overlie the linings for the upper portions of the walls, the linings for the upper portions of the walls being adapted to swing upwardly, and means to secure said linings in their adjusted positions.

9. In a convertible stock and grain car, tracks secured to the side walls thereof, pockets in the end walls of the car, said tracks extended into said pockets, and cross beams slidably mounted on said tracks and adapted to seat in said pockets when not in use, said cross beams being also adapted to be moved out of said pockets and to be spaced apart through the length of the car, and a deck adapted to rest on said cross beams.

Signed by me at Kingsley, Iowa, this 2nd day of May, 1910.

JOHN C. COTTRELL.

Witnesses:
MAGGIE M. ROGERS,
JAMES McDERMOTT.

---

Copies of this patent may be obtained for five cents each, by addressing the "Commissioner of Patents, Washington, D. C."